(12) United States Patent
Vitt et al.

(10) Patent No.: US 10,746,405 B2
(45) Date of Patent: Aug. 18, 2020

(54) APPARATUS AND METHOD FOR USING MODEL TRAINING AND ADAPTATION TO DETECT FURNACE FLOODING OR OTHER CONDITIONS

(71) Applicant: Honeywell International Inc., Morris Plains, NJ (US)

(72) Inventors: Constantine A. Vitt, Gillette, NJ (US); Anna Olecka, St. Petersburg, FL (US); Randy M. Miller, Thousand Oaks, CA (US); Francois Leclerc, Ottawa (CA); Wendy K. Foslien, Minneapolis, MN (US); Hao He, Newton, NJ (US); William Groves, Bear, DE (US)

(73) Assignee: Honeywell International Inc., Morris Plains, NJ (US)

( * ) Notice: Subject to any disclaimer, the term of this patent is extended or adjusted under 35 U.S.C. 154(b) by 372 days.

(21) Appl. No.: 15/722,600

(22) Filed: Oct. 2, 2017

(65) Prior Publication Data
US 2018/0306442 A1      Oct. 25, 2018

Related U.S. Application Data

(60) Provisional application No. 62/489,006, filed on Apr. 24, 2017, provisional application No. 62/489,028, filed on Apr. 24, 2017.

(51) Int. Cl.
*F23N 5/18* (2006.01)
*G06N 3/08* (2006.01)
(Continued)

(52) U.S. Cl.
CPC ............... *F23N 5/18* (2013.01); *F23N 1/042* (2013.01); *F23N 5/242* (2013.01); *F23N 5/26* (2013.01);
(Continued)

(58) Field of Classification Search
None
See application file for complete search history.

(56) References Cited

U.S. PATENT DOCUMENTS

6,080,223 A * 6/2000 Mavronis ............. C21B 7/24
                                                           266/100
7,459,060 B2   12/2008 Stewart
(Continued)

OTHER PUBLICATIONS

U.S. Appl. No. 15/718,481, filed Sep. 28, 2017, 29 pages.
U.S. Appl. No. 15/722,664, filed Oct. 2, 2017, 40 pages.

*Primary Examiner* — Roy Y Yi
(74) *Attorney, Agent, or Firm* — Jason Skinder; Kermit D. Lopez; Luis M. Otis

(57) ABSTRACT

A method includes obtaining data associated with operation of equipment in an industrial process and identifying training data and evaluation data in the obtained data. The method also includes, during each of multiple training periods, identifying one or more models and one or more first statistical values using at least some of the training data and determining a threshold value using the one or more first statistical values. The one or more models represent the operation of the equipment. The method further includes, during each of multiple evaluation periods, determining one or more second statistical values using at least some of the evaluation data and the one or more models, comparing the one or more second statistical values to the threshold value determined in a preceding one of the training periods, and determining whether the equipment is suffering from at least one specified condition based on the comparison. In addition, the method includes, in response to determining that the equipment is suffering from the at least one specified condition, generating an alert identifying the at least one specified condition.

20 Claims, 5 Drawing Sheets

(51) Int. Cl.
F23N 5/26 (2006.01)
F23N 5/24 (2006.01)
F23N 1/04 (2006.01)
G06N 20/00 (2019.01)

(52) U.S. Cl.
CPC ............... *G06N 3/08* (2013.01); *G06N 20/00* (2019.01); *F23N 2005/185* (2013.01); *F23N 2225/04* (2020.01); *F23N 2225/08* (2020.01)

(56) References Cited

U.S. PATENT DOCUMENTS

| | | | |
|---|---|---|---|
| 7,820,012 B2 | 10/2010 | Stewart | |
| 2008/0015814 A1* | 1/2008 | Harvey, Jr. | G05B 19/41875 |
| | | | 702/179 |
| 2016/0146493 A1* | 5/2016 | Ettl | G05B 15/02 |
| | | | 700/29 |

* cited by examiner

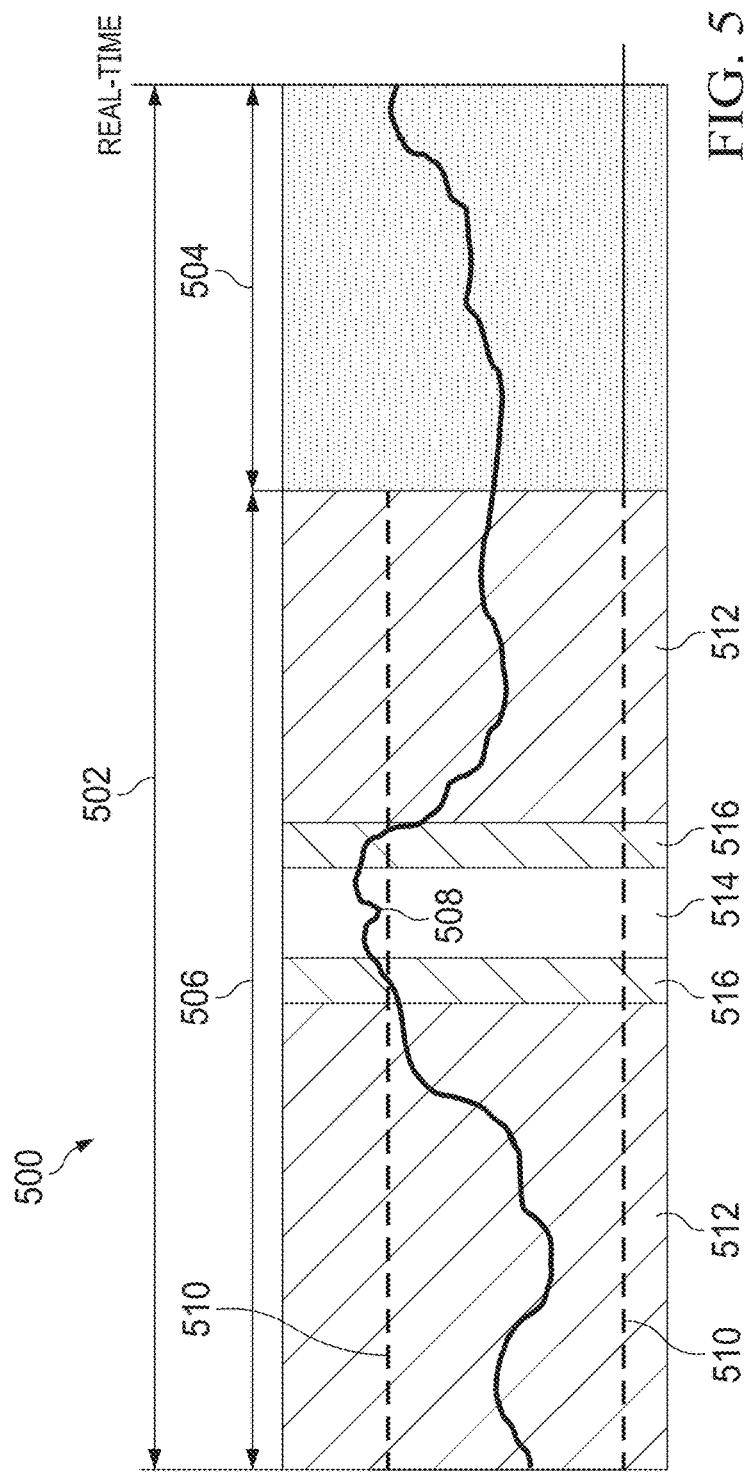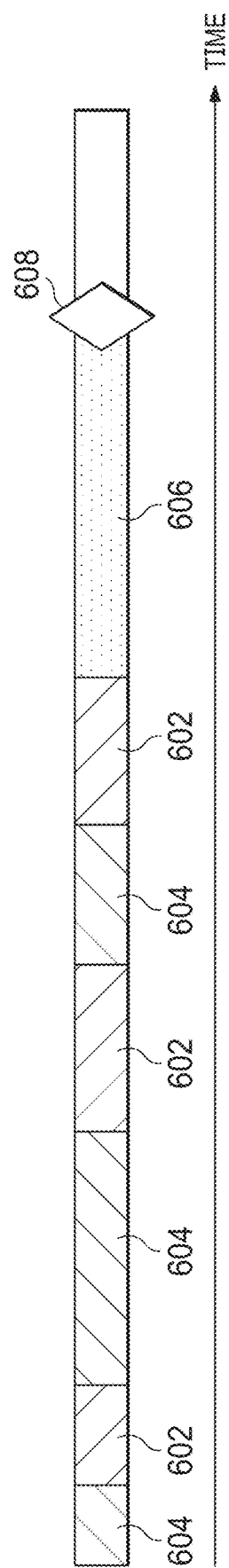

APPARATUS AND METHOD FOR USING MODEL TRAINING AND ADAPTATION TO DETECT FURNACE FLOODING OR OTHER CONDITIONS

CROSS-REFERENCE TO RELATED APPLICATIONS AND PRIORITY CLAIM

This application claims priority under 35 U.S.C. § 119(e) to U.S. Provisional Patent Application No. 62/489,006 and U.S. Provisional Patent Application No. 62/489,028 filed on Apr. 24, 2017. Both of these provisional applications are hereby incorporated by reference in their entirety.

TECHNICAL FIELD

This disclosure generally relates to the monitoring of furnaces or other industrial process equipment. More specifically, this disclosure relates to an apparatus and method for using model training and adaptation to detect furnace flooding or other conditions.

BACKGROUND

Furnaces are used in a variety of industries and in a variety of ways to provide heating. For example, industrial processes in oil and gas refineries, chemical plants, or other industrial facilities often use furnaces to heat materials in order to facilitate desired chemical reactions. A furnace typically operates by receiving flows of fuel (such as fuel gas, fuel oil, coal, or wood chips) and inlet air, and the fuel is combusted in the presence of the inlet air to produce heat that is transferred to a process material. Ideally, the combustion of the fuel and the heating of the process material remain stable, and all or substantially all of the fuel entering the furnace is combusted.

Furnace flooding refers to a condition that can occur when the combustion of fuel gas in a furnace becomes unstable, such as when a ratio of the inlet air flow to the fuel gas flow moves outside of the furnace's operating envelope. When this occurs, the combustion process can become unstable or even stop, resulting in a loss of flame within the furnace. The loss of flame means that no fuel gas is being burned within the furnace. However, fuel gas may continue to be provided into the furnace, resulting in a build-up of uncombusted fuel gas in the furnace. In some circumstances, this could lead to an explosion of the furnace.

SUMMARY

This disclosure provides an apparatus and method for using model training and adaptation to detect furnace flooding or other conditions.

In a first embodiment, a method includes obtaining data associated with operation of equipment in an industrial process and identifying training data and evaluation data in the obtained data. The method also includes, during each of multiple training periods, identifying one or more models and one or more first statistical values using at least some of the training data and determining a threshold value using the one or more first statistical values. The one or more models represent the operation of the equipment. The method further includes, during each of multiple evaluation periods, determining one or more second statistical values using at least some of the evaluation data and the one or more models, comparing the one or more second statistical values to the threshold value determined in a preceding one of the training periods, and determining whether the equipment is suffering from at least one specified condition based on the comparison. In addition, the method includes, in response to determining that the equipment is suffering from the at least one specified condition, generating an alert identifying the at least one specified condition.

In a second embodiment, an apparatus includes at least one processing device configured to obtain data associated with operation of equipment in an industrial process and identify training data and evaluation data in the obtained data. The at least one processing device is also configured to, during each of multiple training periods, identify one or more models and one or more first statistical values using at least some of the training data and determine a threshold value using the one or more first statistical values. The one or more models represent the operation of the equipment. The at least one processing device is further configured to, during each of multiple evaluation periods, determine one or more second statistical values using at least some of the evaluation data and the one or more models, compare the one or more second statistical values to the threshold value determined in a preceding one of the training periods, and determine whether the equipment is suffering from at least one specified condition based on the comparison. In addition, the at least one processing device is configured to, in response to determining that the equipment is suffering from the at least one specified condition, generate an alert identifying the at least one specified condition.

In a third embodiment, a non-transitory computer readable medium contains instructions that when executed cause at least one processing device to obtain data associated with operation of equipment in an industrial process and identify training data and evaluation data in the obtained data. The medium also contains instructions that when executed cause the at least one processing device to, during each of multiple training periods, identify one or more models and one or more first statistical values using at least some of the training data and determine a threshold value using the one or more first statistical values. The one or more models represent the operation of the equipment. The medium further contains instructions that when executed cause the at least one processing device to, during each of multiple evaluation periods, determine one or more second statistical values using at least some of the evaluation data and the one or more models, compare the one or more second statistical values to the threshold value determined in a preceding one of the training periods, and determine whether the equipment is suffering from at least one specified condition based on the comparison. In addition, the medium contains instructions that when executed cause the at least one processing device to, in response to determining that the equipment is suffering from the at least one specified condition, generate an alert identifying the at least one specified condition.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 5 illustrates an example technique for retraining a model used to detect furnace flooding or other conditions according to this disclosure; and FIG. 6 illustrates an example of second stage processing used to detect furnace flooding or other conditions according to this disclosure.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
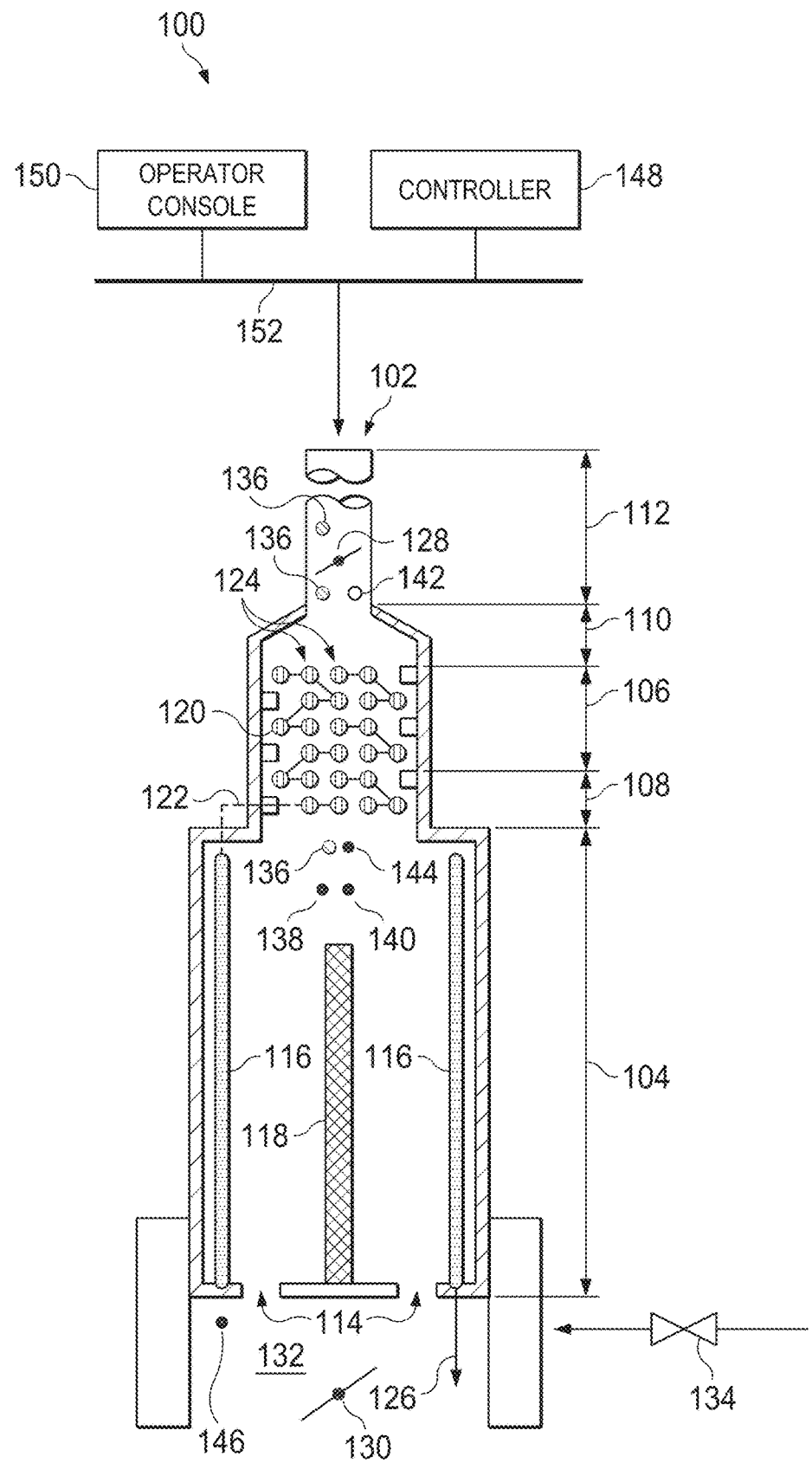
FIG. 1 illustrates an example system for detection of furnace flooding or other conditions according to this disclosure.

FIG. 1 illustrates an example system 100 for detection of furnace flooding or other conditions according to this disclosure. As shown in FIG. 1, the system 100 includes or operates in conjunction with a furnace 102. The furnace 102 generally operates by receiving at least one fuel gas flow and at least one inlet air flow. The fuel gas is ignited within the furnace 102 and burns in the presence of oxygen contained in the inlet air, thereby producing heat. The generated heat can be used to heat one or more materials, such as one or more flows of fluid (like one or more gases or liquids) in a process flow.

In the example shown in FIG. 1, the furnace 102 includes a radiant section 104, a convection section 106, a shield section 108, a breech 110, and a stack 112. The radiant section 104 is generally configured to transfer radiant heat into one or more materials being heated, while the convection section 106 is generally configured to pre-heat the one or more materials before the materials enter the radiant section 104. The shield section 108 generally separates the radiant section 104 from the convection section 106 and helps to protect the convection section 106 from direct radiant heating. The breech 110 generally denotes the transition from the convection section 106 to the stack 112, and the stack 112 generally allows exhaust to exit the furnace 102.

The radiant section 104 of the furnace 102 in FIG. 1 includes one or more burners 114, which are configured to ignite fuel gas entering the furnace 102. The heat created when the fuel gas burns radiates into one or more radiant tubes 116, which contain the one or more materials being heated. A bridgewall 118 divides the lower portion of the radiant section 104 into different spaces to facilitate more effective heating by the burners 114. Each burner 114 includes any suitable structure for igniting and burning fuel gas. Each radiant tube 116 includes any suitable structure for transporting material that is being heated. The bridgewall 118 includes any suitable structure for dividing a space.

The convection section 106 and the shield section 108 of the furnace 102 in FIG. 1 include one or more coils 120, which are connected to the one or more radiant tubes 116 via one or more crossovers 122. The coils 120 receive the one or more materials to be heated through one or more inlets 124, and the materials travel through the coil(s) 120 to the radiant tube(s) 116 before exiting through one or more outlets 126. The coils 120 can travel back and forth in the space between the radiant section 104 and the stack 112. By passing the one or more materials through the coils 120, the materials can be pre-heated in the convection section 106 before the materials are heated in the radiant section 104. Each coil 120 includes any suitable structure for transporting material being heated. Each crossover 122 includes any suitable structure for linking a coil and a radiant tube.

A stack damper 128 is located at or near the top of the furnace 102 and is used to control the flow of exhaust out of the furnace 102 through the stack 112. For example, the stack damper 128 could denote a flat circular, square, or other structure that can be rotated to change the size of a passageway through the stack 112. Similarly, a plenum damper 130 is located at or near the bottom of the furnace 102, such as within a plenum chamber 132. The plenum damper 130 is used to control the flow of inlet air into the furnace 102. The plenum damper 130 could denote a flat circular, square, or other structure that can be rotated to change the size of a passageway through the plenum chamber 132. The plenum chamber 132 denotes an area where fuel gas and inlet air are received and mixed before entering the furnace 102. A valve 134 or other structure could be used to control the flow of fuel gas into the furnace 102 at or near the bottom of the furnace 102, such as into the plenum chamber 132. Each damper 128 and 130 includes any suitable structure for controlling fluid flow. The plenum chamber 132 includes any suitable structure for receiving and providing fluid. The valve 134 includes any suitable structure for controlling a fuel gas flow.

Various sensors can be positioned within or otherwise used in conjunction with the furnace 102. For example, one or more draft gauges 136 could be used to measure airflow through one or more portions of the furnace 102. One or more oxygen sensors 138 could be used to measure the oxygen level at one or more locations within the furnace 102. One or more pressure sensors 140 could be used to measure the pressure level at one or more locations within the furnace 102. One or more temperature sensors 142 could be used to measure the temperature at one or more locations within the furnace 102 or to measure the temperature of a process fluid (the material being heated by the furnace 102). One or more sensors 144 could be used to measure an amount of combustible material at one or more locations within of the furnace 102. One or more sensors 146 could be used to measure flows of material (such as fuel or air) into the furnace 102.

Each of the sensors 136-146 includes any suitable structure for measuring one or more characteristics in or associated with a furnace. As particular examples, the sensors could include THERMOX combustion analyzers or combustion analyzers using tunable diode lasers. Note that the numbers and positions of the various types of sensors in FIG. 1 are for illustration only. Any number of each type of sensor and any suitable arrangement of those sensors could be used in the furnace 102. Also note that any other or additional types of sensors could be used in the furnace 102.

This represents a brief description of one type of furnace 102 that may be used to produce heat. Additional details regarding this type of furnace 102 are well-known in the art and are not needed for an understanding of this disclosure. Note that the general structure of the furnace 102 shown in FIG. 1 is for illustration only. Furnaces can come in a wide variety of designs and configurations, and the example of the furnace 102 shown in FIG. 1 is for illustration only. Other types of furnaces could be used here, such as furnaces that operate using other fuels like fuel oil, coal, or wood chips.

The system 100 may also include at least one controller 148 that is used to control various aspects of the furnace's operation. For example, industrial equipment is typically associated with controlled, manipulated, and disturbance variables. A controlled variable generally denotes a variable whose value can be measured or inferred and that is controlled to be at or near a desired setpoint or within a desired range. A manipulated variable generally denotes a variable that can be altered in order to adjust one or more controlled variables. A disturbance variable generally denotes a variable whose value can be considered but not controlled when determining how to adjust one or more manipulated variables to achieve desired changes to one or more controlled variables.

The controller 148 receives measurements from the various sensors 136-146, as well as setpoints for various controlled variables. The controller 148 uses this information to generate control signals for adjusting the operation of the furnace 102. For example, the controller 148 could receive pressure measurements and a pressure setpoint and, based on differences between the two, generate a control signal to vary the position or opening of the stack damper 128. The controller 148 could also receive oxygen level measurements and an oxygen level setpoint and, based on differences between the two, generate a control signal to vary the position or opening of the plenum damper 130. The controller 148 could further receive temperature measurements and a temperature setpoint and, based on differences between the two, generate a control signal to vary the amount of fuel gas entering the furnace 102, such as by adjusting the valve 134 that controls the fuel gas flow. Other or additional operations could also occur using the controller 148 to control other or additional aspects of the furnace 102.

The controller 148 includes any suitable structure for controlling one or more characteristics associated with a furnace or other industrial equipment. The controller 148 could, for example, represent a proportional-integral-derivative controller or a multivariable controller, such as a controller implementing model predictive control or other advanced predictive control. As a particular example, the controller 148 could represent a computing device running a real-time operating system, a WINDOWS operating system, or other operating system.

Note that while one controller 148 is shown here, other numbers of controllers could also be used. For example, separate controllers could be used to control separate aspects of the furnace 102, such as when different controllers are used in different single-input, single-output (SISO) control loops or other control loops. Also note that multiple controllers could be arranged hierarchically, such as when one or more lower-level controllers execute control logic for controlling the equipment and one or more higher-level controllers execute planning, optimization, or other functions. Further note that the use of a controller is not specifically required here. As long as there is some type of microprocessor, edge device, data acquisition system, or other device/system that can collect data associated with operation of the furnace 102 or other equipment for use in analyzing the equipment, it may be immaterial how many controllers are used in the system 100.

Operator access to and interaction with the controller 148 and other components of the system 100 can occur via one or more operator consoles 150. Each operator console 150 could be used to provide information to an operator and receive information from an operator. For example, each operator console 150 could provide information identifying a current state of industrial equipment to the operator, such as values of various process variables and warnings, alarms, or other states associated with the furnace 102 or other equipment. Each operator console 150 could also receive information affecting how the furnace 102 or other equipment is controlled, such as by receiving setpoints for process variables controlled by the controller 148 or other information that alters or affects how the controller 148 control the furnace 102 or other equipment. Each operator console 150 includes any suitable structure for displaying information to and interacting with an operator. Each operator console 150 could, for instance, represent a computing device running a WINDOWS operating system or other operating system.

At least one network 152 couples the controller 148, operator console 150, sensors, actuators, and other components in the system 100. Each network 152 facilitates the transport of information between different components. For example, the network 152 could transport measurement data from the sensors and provide control signals to the actuators of the furnace 102. The network 152 could represent any suitable network or combination of networks. As particular examples, the network 152 could represent at least one Ethernet network, electrical signal network (such as a HART network), pneumatic control signal network, or any other or additional type(s) of network(s).

As described above, furnace flooding can occur when the combustion of fuel gas in the furnace 102 becomes unstable, such as when a ratio of the inlet air flow to the fuel gas flow moves outside of the furnace's operating envelope. Various causes may exist for furnace flooding. For example, if an oxygen sensor 138 in the furnace 102 clogs or otherwise fails to operate correctly, the oxygen sensor 138 could generate oxygen level measurements that are higher than the actual oxygen level. This may cause the controller 148 to close the plenum damper 130 more than needed, which reduces the amount of inlet air (and therefore oxygen) in the furnace 102 and can cause the combustion to become unstable. When this occurs, a loss of flame within the furnace 102 can occur.

Furnace flooding can lead to a dangerous explosive event, and operators often need to react quickly to any indicator of potential furnace flooding. In one conventional approach, a reduction in excess oxygen gas, an elevated level of unburned fuel (called combustibles), or a combination of these are used as a leading indicator of a flooding event. An operator may react to either condition by reducing fuel flow and increasing air flow within the furnace 102. This usually mitigates the conditions that could lead to a furnace explosion, but these leading indicators often come late in the process and sometimes do not leave operators sufficient time to react. Moreover, the operators' efforts to resolve these conditions sometimes require or result in an abrupt shutdown of the furnace 102, causing production disruption in other parts of an industrial facility (such as a refinery) and wasted product. Furnace flooding could occur more frequently during a furnace startup after a shutdown since the startup is often a highly manual process.

In another conventional approach, anomaly detection models based on Principal Components Analysis (PCA) are used to detect potential furnace flooding. However, these models are often specific to one particular furnace, meaning there is no ability to transfer a model from one furnace to another. Moreover, these models are only mathematical estimations of the behavior of a furnace or other industrial equipment. Changes in the industrial equipment over time (which may be common in many industries) can render a model unsuitable for use even with the furnace for which that model was specifically designed.

As described in more detail below, this disclosure provides techniques for reliable on-line prediction of furnace flooding or other equipment conditions. Among other things, these techniques can be used to generate timely alerts in response to potential flooding conditions or other equipment conditions. The alerts could typically be generated with enough lead time for operators to make necessary adjustments, such as at least ten to twenty minutes before actual flooding. This reduces the number of potentially hazardous occurrences and allows a safe controlled response to move a furnace or other equipment to a safe operating condition. In many cases, this can be accomplished without taking the equipment down entirely, meaning no shutdown and therefore no significant process interruptions occur.

Also, this approach supports the retraining of one or more models used for the detection of furnace flooding or other conditions. As a result, this approach is transferable among multiple furnaces or other equipment and adjusts to changing conditions within the same equipment.

Further, the techniques described below can support multiple-stage determinations of whether flooding or other conditions are or might be occurring. In an unbalanced data situation (such as when only a few furnace floods occur a year and non-flood operational conditions exist for the remainder of time), one-stage solutions could potentially produce a high number of false positives, meaning they indicate that flooding is occurring when it is actually not. This is often an annoyance for operators, who end up ignoring these alarms. By separating various tasks into separate stages (such as the identification of anomalous conditions in one stage and the separation of flood-leading and non-flood-leading events in another stage), the techniques in this document provide operators with fewer false positive alerts. This allows the operators to follow through on the actual alerts that are generated.

In addition, because furnaces can be used in facilities like oil and gas refineries, any shutdown of a furnace can have significant economic impacts on the owners or operators of the facilities. By reducing the number of furnace shutdowns, the techniques described in this document can provide significant economic benefits for the owners or operators.

Note that while often described as being used to detect furnace flooding, the same techniques provided in this document can be used with other industrial equipment. For example, these techniques could be used with industrial equipment that typically achieves an equilibrium during normal operation. The techniques described below can then operate to detect when there is an unexpected deviation from this equilibrium. This includes furnaces that operate using other fuels like fuel oil, coal, or wood chips. While furnace flooding may not be an issue in these types of furnaces, the techniques described below could still be used to identify problems with those furnaces.

Additional details regarding this furnace flooding or other condition detection functionality are provided below. Note that this condition detection functionality could be implemented in any suitable manner. For example, the condition detection functionality could be implemented using software or firmware instructions that are executed by one or more processors of a computing device, such as a desktop, laptop, server, or tablet computer. As a particular example, the condition detection functionality could be implemented by the controller 148, the operator station 150, or another device within the system 100 (such as another device coupled to the network 152 or to another network). The condition detection functionality could also be implemented outside of the system 100, such as in a remote server, a cloud-based environment, or any other computing system or environment communicatively coupled to the system 100.

Although FIG. 1 illustrates one example of a system 100 for detection of furnace flooding or other conditions, various changes may be made to FIG. 1. For example, the system 100 could include any number of furnaces, sensors, actuators, controllers, operator stations, networks, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control or automation systems are highly configurable and can be configured in any suitable manner according to particular needs. In addition, FIG. 1 illustrates one example operational environment where detection of a problem with equipment can be used. This functionality can be used in any other suitable system, and the system need not include a furnace.

Figure 2:
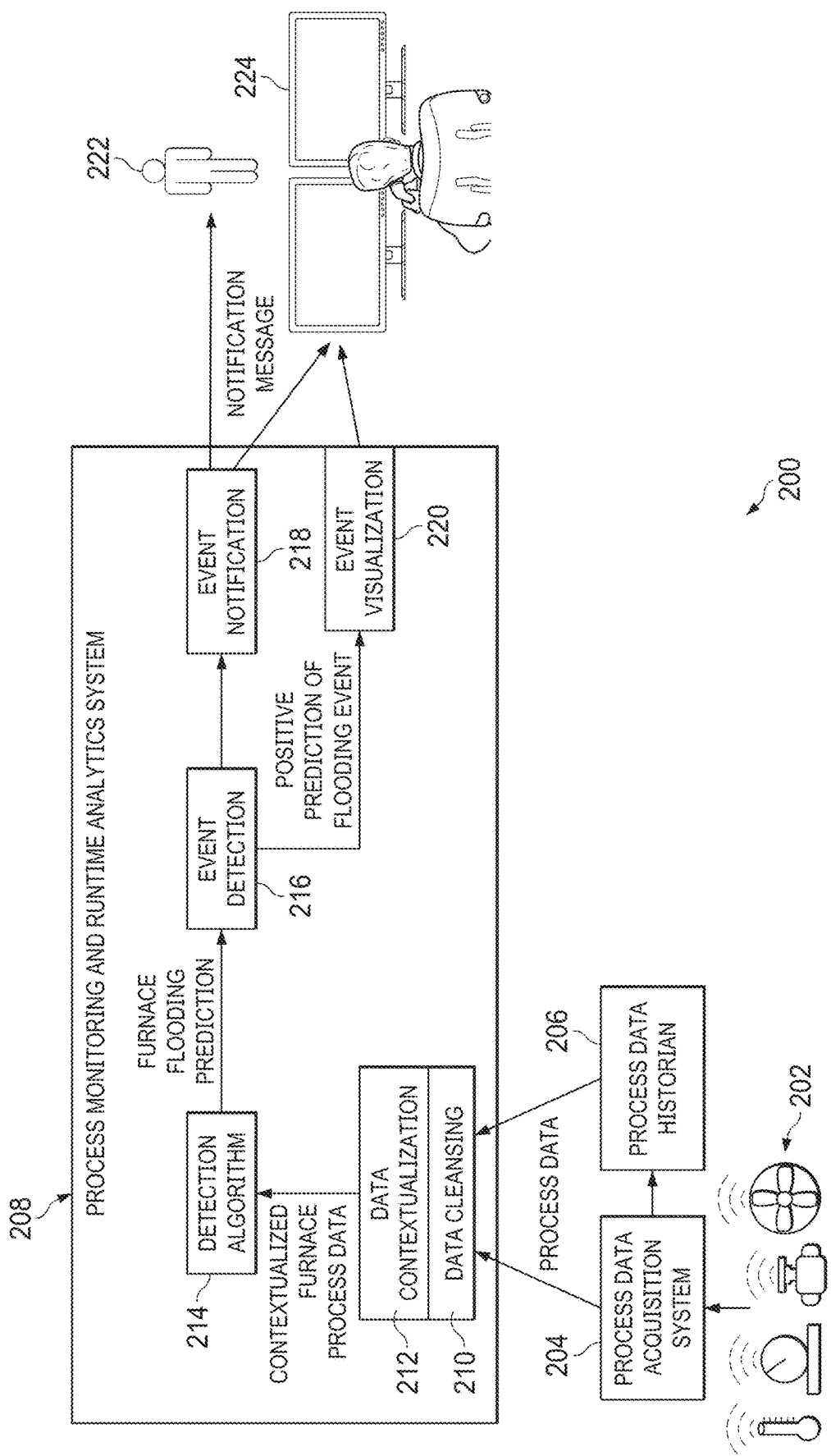
FIG. 2 illustrates an example data flow supporting model training and adaptation to detect furnace flooding or other conditions according to this disclosure.

FIG. 2 illustrates an example data flow 200 supporting model training and adaptation to detect furnace flooding or other conditions according to this disclosure. The data flow 200 could, for example, be supported in the system 100 to detect furnace flooding with the furnace 102. However, the data flow 200 could be used with any other suitable system and with any other suitable process equipment.

As shown in FIG. 2, the data flow 200 includes the use of various sensors 202, which provide sensor measurements or other data to a process data acquisition system 204. The sensors 202 could denote the various sensors 136-146 used in or with the furnace 102 of FIG. 1 or other sensors used with process equipment being monitored. The process data acquisition system 204 collects the data from the sensors 202, such as via wired or wireless connections. The process data acquisition system 204 can also provide at least some of the data to a process data historian 206 for longer-term storage. The process data acquisition system 204 includes any suitable structure configured to collect data from multiple sensors. The process data historian 206 includes any suitable structure configured to store process data, including at least some of the data from the sensors 202.

A process monitoring and runtime analytics system 208 processes the data from the sensors 202 to determine whether the process equipment being monitored is suffering or potentially suffering from one or more conditions, such as furnace flooding. As shown in FIG. 2, the system 208 supports or executes a data cleansing function 210, a data contextualization function 212, and a detection algorithm 214. The cleansing function 210 generally operates to receive data from the sensors 202 via the process data acquisition system 204 and/or the process data historian 206. The cleansing function 210 filters or otherwise processes the data from the sensors 202 to identify data that is suitable for use in training the detection algorithm 214 or being evaluated by the detection algorithm 214. Any suitable filtering can be supported by the cleansing function 210.

The data contextualization function 212 processes the data to identify data that can be used for training the detection algorithm 214 (during training periods) and data that can be used to evaluate whether process equipment is suffering from a specified condition (during evaluation periods). The data contextualization function 212 can use any suitable criteria to select data for training or evaluation. Example criteria are provided below, although other criteria could also be used.

The detection algorithm 214 processes the data provided via the data contextualization function 212. The detection algorithm 214 uses the data to determine whether a furnace or other equipment is suffering from flooding or other issues. As described in more detail below, the detection algorithm 214 generates at least one model of the equipment being monitored using training data and detects problems with the equipment using the model(s) and evaluation data. The detection algorithm 214 also retrains and adapts its model(s) to account for changing conditions with the equipment. This also allows the detection algorithm 214 to be used across multiple furnaces or other equipment.

The detection algorithm 214 can output predictions identifying furnace flooding or other conditions. The predictions could be used in any suitable manner. In this example, the predictions are provided to an event detection function 216, which determines when specified events (such as positive predictions identifying actual or potential flooding or other conditions) are output by the detection algorithm 214. The event detection function 216 can then provide an identity of the events to an event notification function 218 and/or an event visualization function 220. The event notification function 218 generates event notification messages that are transmitted to one or more mobile devices or other devices associated with one or more users 222. The event visualization function 220 generates event notification messages that are transmitted to one or more display devices 224, which could be associated with one or more operator consoles 150. The event notification messages can identify warnings, alarms, or other notifications associated with detected flooding events or other events.

Each function 210-220 of the process monitoring and runtime analytics system 208 could be implemented in any suitable manner. For example, the process monitoring and runtime analytics system 208 could be implemented using one or more computing devices, and the functions 210-220 could be implemented using software instructions executed by the computing devices. Note that any number of computing devices could be used, such as when different computing devices perform different functions or subsets of functions. Also note that the computing devices need not form part of the system in which the process equipment that is being monitored is located. For instance, the process monitoring and runtime analytics system 208 could be implemented using a remote server, a cloud-based environment, or other computing system or environment configured to receive the data from the sensors 202 and initiate notifications.

Although FIG. 2 illustrates one example of a data flow 200 supporting model training and adaptation to detect furnace flooding or other conditions, various changes may be made to FIG. 2. For example, the functionality of the process monitoring and runtime analytics system 208 could be implemented in any other suitable manner.

Figure 3:
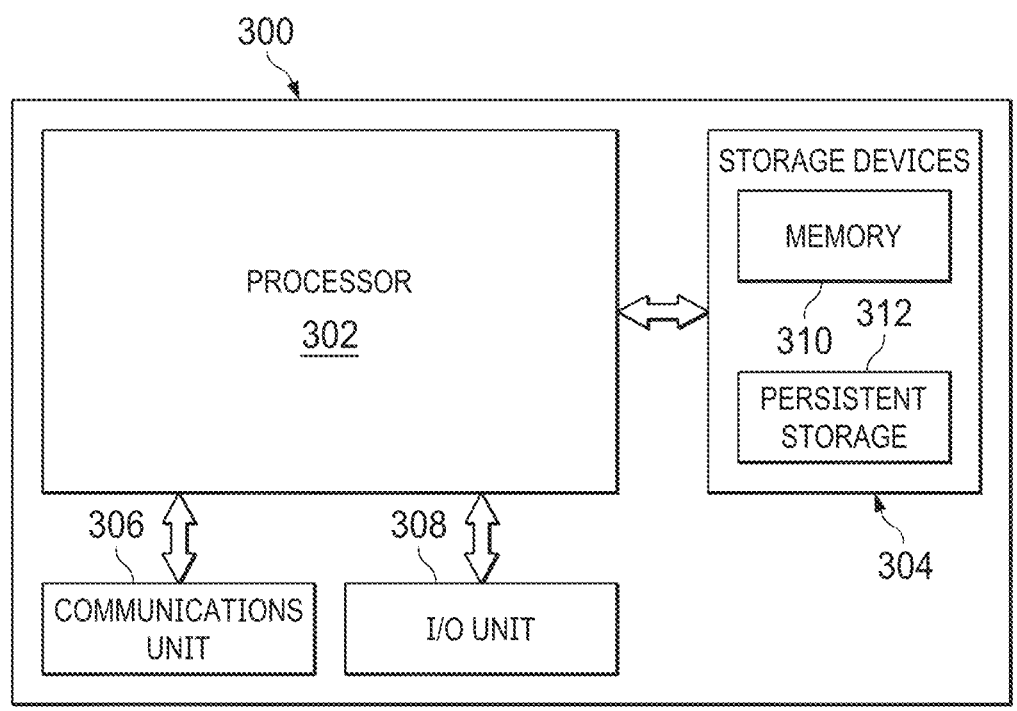
FIG. 3 illustrates an example device for detection of furnace flooding or other conditions according to this disclosure.

FIG. 3 illustrates an example device 300 for detection of furnace flooding or other conditions according to this disclosure. The device 300 could, for example, denote the controller 148, operator station 150, or other device within or used in conjunction with the system 100 in FIG. 1. The device 300 could also implement the process monitoring and runtime analytics system 208 of FIG. 2. However, the device 300 could be used in any other suitable system, and the process monitoring and runtime analytics system 208 could be implemented in any other suitable manner.

As shown in FIG. 3, the device 300 includes at least one processor 302, at least one storage device 304, at least one communications unit 306, and at least one input/output (I/O) unit 308. Each processor 302 can execute instructions, such as those that may be loaded into a memory 310. The instructions could implement the furnace flooding or other condition detection functionality described in this patent document. Each processor 302 denotes any suitable processing device, such as one or more microprocessors, microcontrollers, digital signal processors, application specific integrated circuits (ASICs), field programmable gate arrays (FPGAs), or discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 could include a network interface card or a wireless transceiver facilitating communications over a wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

Although FIG. 3 illustrates one example of a device 300 for detection of furnace flooding or other conditions, various changes may be made to FIG. 3. For example, components could be added, omitted, combined, further subdivided, or placed in any other suitable configuration according to particular needs. Also, computing devices can come in a wide variety of configurations, and FIG. 3 does not limit this disclosure to any particular configuration of computing device.

Figure 4:
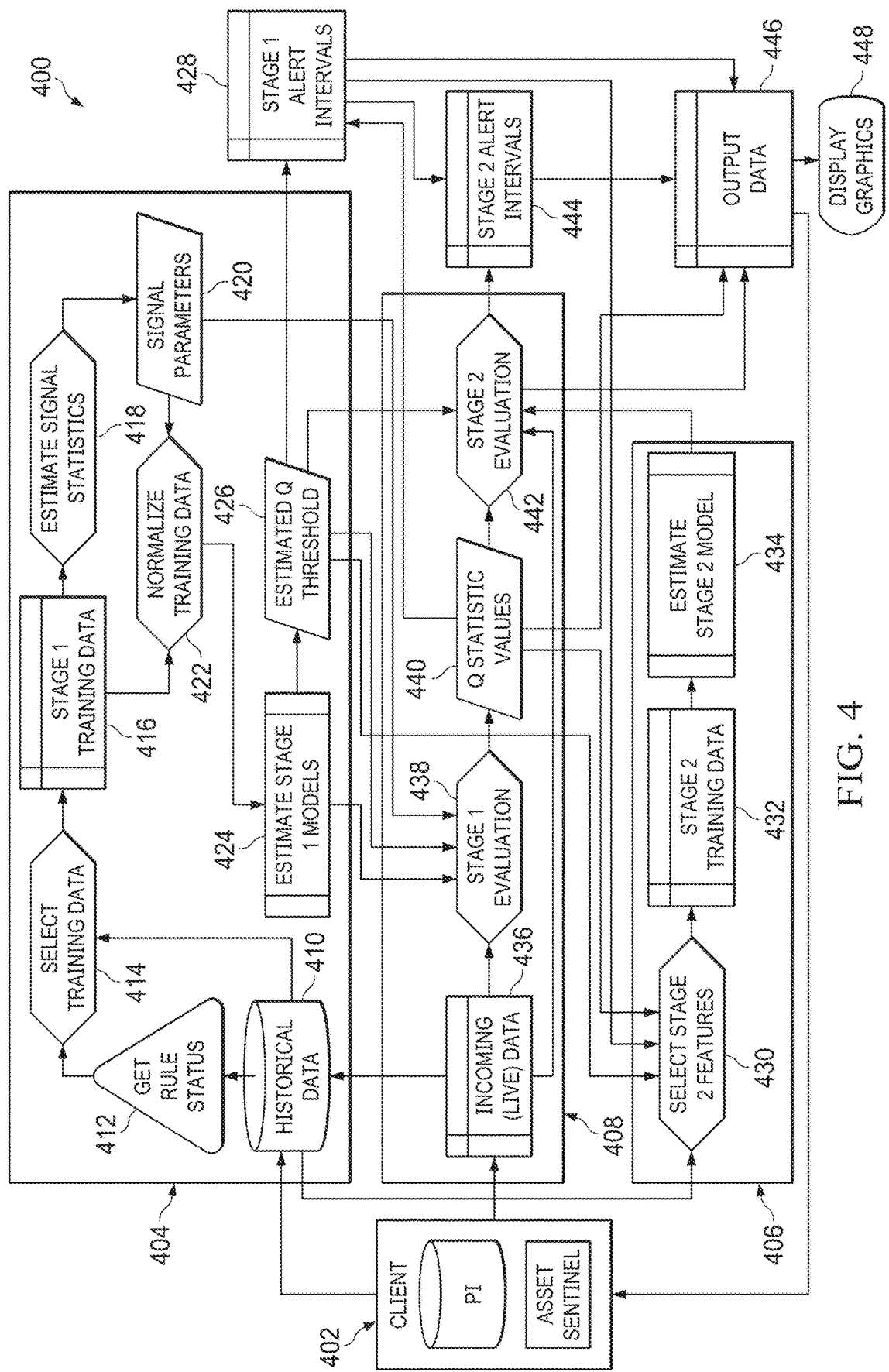
FIG. 4 illustrates an example method for detection of furnace flooding or other conditions according to this disclosure.

FIG. 4 illustrates an example method 400 for detection of furnace flooding or other conditions according to this disclosure. For ease of explanation, the method 400 may be described as being performed by the device 300 of FIG. 3 supporting the process monitoring and runtime analytics system 208 of FIG. 2 in the system 100 of FIG. 1. However, the method 400 could be used with any other suitable device and in any other suitable system (even those without furnaces).

As shown in FIG. 4, the method 400 includes collecting data related to a furnace or other industrial equipment from one or more client devices 402. This could include, for example, the processor 302 receiving the data from the sensors 202 via the process data acquisition system 204 and/or the process data historian 206. The collected data can include specific information related to operation of a furnace or other industrial equipment, such as data related to certain process variables. The actual process variable data that is collected in this step could be selected based on the domain expertise of personnel familiar with the specific industrial equipment to be monitored.

In the particular example shown in FIG. 4, the client devices 402 could include at least one PLANT INFORMATION (PI) server from HONEYWELL INTERNATIONAL INC. or other data collection device(s). The PI server could denote a process historian or other device that collects information associated with an industrial process over time, such as sensor measurements, actuator control signals, or other data. The client devices 402 could also include at least one monitoring application that collects the data from one or more controllers 148 or other devices. An example monitoring application is the UNIFORMANCE ASSET SENTINEL software from HONEYWELL INTERNATIONAL INC.

The method 400 generally includes a "stage one" training process 404, a "stage two" training process 406, and an evaluation process 408. The stage one training process 404 generally collects historical data 410 associated with operation of industrial equipment being monitored. The historical data 410 includes data from the client devices 402. The historical data 410 could be pre-processed in any suitable manner to prepare the data for use in the stage one training process 404. For example, the data could be synchronized, such as by synchronizing the time stamps of the data to organize the data over time. This may be necessary, for instance, when different sensors collect data at different frequencies, and the data could be mapped to a common time scale (such as one-minute intervals).

The stage one training process 404 generally denotes the operations used to train one or more models for detecting abnormal conditions with the equipment being monitored. One or more rules 412 can be used to identify when training or evaluation is to occur. The rules 412 could, for example, specify operational rules or ranges for a subset of the selected process variables. The ranges can be used as guidelines for selecting training data, which is used in the stage one training process 404 to generate the one or more models.

The rules 412 are used to select training data during operation 414, and the resulting training data is stored in one or more data tables or other files 416. Statistics for the training data are estimated during operation 418, and the statistics are stored as signal parameters 420. The training data is also normalized based on the signal parameters during operation 422, and the resulting data is used to generate one or more stage one models 424 and at least one threshold 426 (which are both used in the evaluation process 408).

In some embodiments, the stage one training process 404 could be implemented as follows. Normal distribution parameters for each process variable signal are estimated and stored as the signal parameters. Normalization of each process variable signal is performed, such as based on the following.

$$X_t^i = \frac{Z_t^i - \mu_t^{z^i}}{\sigma^{z^i}} \quad (1)$$

Here, i denotes the $i^{th}$ signal being observed, and t denotes an index signifying a single arbitrary time instant. Also, Z denotes a raw signal, X denotes a normalized signal, μ denotes an expected value or average value, and σ denotes a standard deviation across the training data (where these values are signal-specific as indicated by the i superscript). A multivariate regression is formulated for each process variable signal, where a target process variable signal is a dependent variable and the remaining process variable signals are the independent variables. An example of this can be expressed as:

$$X_t^i = \hat{X}_t^i + \varepsilon_t^i = \beta_0 + \sum_{j \neq i} \beta_j X_t^j + \varepsilon_t^i \quad (2)$$

Here, the set of β values denotes the coefficients of the models, and ε denotes the residual errors (residual process) for each time instant for each signal. This set of regression equations describes the stage one models being estimated in step 424. The regression equations generated by the multivariate regression define an equilibrium state of the equipment being monitored. The coefficients for the set of multivariate regressions are estimated and stored. The standard deviation of the resulting residuals are obtained and stored for each equation, and the corresponding residuals are rescaled. This could be expressed as:

$$\epsilon_t^i = \frac{\varepsilon_t^i}{\sigma^{\varepsilon^i}} \quad (3)$$

Here, ε denotes the rescaled residual errors, and σ denotes the standard deviation for the specific residual process. For every time instant in the training data, the sum of the squared (scaled) residuals is calculated. This sum, for each time instant, is referred to as the Q-statistic and could be expressed as follows.

$$Q_t = \sum_{i=1}^{n} (\epsilon_t^i)^2 \quad (4)$$

Here, $Q_t$ denotes the value of the Q-statistic at time t. The normal distribution parameters, mean, and standard deviation of the Q-statistic across the training data are determined. Using these parameters and a chosen alpha-quantile (ρ-value), a statistical threshold for the Q-statistic can be computed. The statistical threshold for the Q-statistic could be expressed as:

$$\overline{Q} = \mu^Q - F_\Phi^{-1}(\rho)\sigma^Q \quad (5)$$

Here, $\overline{Q}$ denotes the threshold value, $\mu^Q$ denotes the expected or average value, and $\sigma^Q$ denotes the standard deviation of the Q-statistic across the training data. Also, $F_\Phi^{-1}(\rho)$ denotes the inverse of the cumulative distribution function (otherwise known as the quantile function), and it returns a quantile value for a given probability ρ. The Φ subscript indicates that this represents the quantile function of a standard normal distribution. The threshold value $\overline{Q}$ is used in the evaluation process 408.

The results of the stage one training process 404 can include a set of equations that model the equilibrium of the equipment being monitored. Each equation can describe the variability of one process variable signal, which is estimated by the behaviors of the other process variable signals. The equations are estimated (trained) under "normal" operation as described above. The results of the stage one training process 404 also include the Q-statistic threshold, which defines a value above which there may be instability in the equipment being monitored.

The first part of the evaluation process 408 uses "live" evaluation data that is stored in one or more data tables or other files 436. The evaluation data could, for example, denote real-time data related to operation of the equipment being monitored. In particular embodiments, the evaluation data could denote data received in JavaScript Object Notation (JSON) payloads. The evaluation data is evaluated during a stage one evaluation operation 438 in order to generate statistical values 440 for the evaluation data. The statistical values 440 are compared to the threshold value 426 to determine whether stage one alerts 428 should be generated indicative of furnace flooding or other problem.

In some embodiments, this portion of the evaluation process 408 could be implemented as follows. Incoming process variable signals are normalized using the signal parameters 420 that were estimated during the stage one training process 404. This could be expressed as follows.

$$X_t^i = \frac{Z_t^i - \mu_t^{Z^i}}{\sigma^{Z^i}} \quad (6)$$

This represents the same type of calculation described above. A prediction for each process variable signal is obtained and is based on the estimated regression coefficients. The prediction could be expressed as:

$$\hat{X}_t^i = \beta_0 + \sum_{j!=i} \beta_j X_t^j \quad (7)$$

Here, $\hat{X}$ denotes a predicted value of the $i^{th}$ signal at time t based on the other signals and the previously-estimated $\beta$ coefficients. Errors are calculated based on the instantaneous predictions and the actual normalized signals, and the errors are rescaled based on the residual standard deviations estimated during the stage one training process 404. This could include obtaining a residual matrix by subtracting the predictions from the actual signals and rescaling the residuals. The residual matrix could be determined as follows:

$$X_t^i - \hat{X}_t^i = \begin{bmatrix} \varepsilon_t^1 \\ \vdots \\ \varepsilon_t^n \end{bmatrix} \quad (8)$$

Here, the matrix on the right denotes the previously-mentioned errors for each signal in vector form. The residuals could be rescaled as follows:

$$\epsilon_t^i = \frac{\varepsilon_t^i}{\sigma^{\varepsilon^i}} \quad (9)$$

An instantaneous Q-statistic can be calculated as follows.

$$Q_t = \sum_{i=1}^{n} (\epsilon_t^i)^2 \quad (10)$$

The instantaneous Q-statistic is compared to the threshold $\bar{Q}$. If the threshold is exceeded, this indicates a departure from "normal" operation, and a stage one alert 428 can be triggered.

Note that the method 400 could end here without the stage two training process 406 or the remaining portion of the evaluation process 408. In this case, any stage one alerts could be used to generate a warning, alarm, or other output to one or more human operators. However, as described above, false positives can be a problem in unbalanced data situations. False positives are undesirable because they can cause human operators to ignore false (incorrect) positives and possibly miss true (correct) positives. To help combat this, the stage two training process 406 and the remaining portion of the evaluation process 408 can be performed to classify the stage one alerts into true positive events and false positive events.

The stage two training process 406 here generates one or more additional models used by the evaluation process 408. During the stage two training process 406, second stage features are selected during operation 430, and second stage data associated with the selected features is stored in one or more data tables or other files 432. The selection of the second stage features combines data from the designated process variable signals to be monitored with the estimated statistical threshold and the calculated Q-statistic values for each time instant. From this augmented data, all observations within the stage one data segments that do not result in a flooding event are assigned to a first class. Of the data segments that do result in flooding events, observations prior to the flooding events are assigned to a second class. In some embodiments, only stage one alerts 428 that last for at least a specified period of time (such as five minutes) are used for stage two training.

At least one second stage model 434 is generated using the non-discarded data. In some embodiments, this could involve estimating and fitting a support vector machine (SVM) classifier model onto the stage one alerts. A support vector machine generally operates to find a hyperplane that separates two classes of objects. In this case, the idea of the hyperplane is to separate true positive alarms and false positive alarms when the Q-statistic values are signaling a lack of normality. Because it is not always possible to find a hyperplane in a space defined by the dimensions of a problem, the data can be mapped to a higher-dimensional feature space. A hyperplane is then selected that maximizes the distance between that hyperplane and the furthest point of each separated class. In some embodiments, this can be accomplished by the use of a kernel function, which enables distance calculations in the high-dimensional feature space without ever computing the coordinates of the data in that space (this is known as the "kernel trick"). The kernel function chosen for this classifier could be a radial basis function. A formal representation of this approach could be expressed as:

$$\min_{\alpha} \frac{1}{2} \alpha^T W \alpha - e^T \alpha \quad (11)$$

$$\text{s.t. } 0 \leq \alpha_i \leq C, i = 1, \ldots, \ell \quad (12)$$

$$y^T \alpha = 0 \quad (13)$$

$$W_{ij} = y_i y_j K(x_i, x_j) \quad (14)$$

$$K(x_i, x_j) = \exp\{-\gamma |x_i - x_j|^2\} \quad (15)$$

This is a common formulation of the dual-problem for SVM optimization, which could be part of a standard library (LIBSVM) utilized to perform the computation. Here, $\alpha$ denotes an l-dimensional vector of decision variables that are being minimized, and W denotes an l×l positive semi-definite matrix where each element is described by Equation (14). Also, e is a vector of ones having a dimension of l, and y is an indicator function that returns a vector of dimension l with values being either +1 or −1. Further, K(•) is the radial basis kernel function used in this particular setting, and is the number of observations for the two classes (true positives and false positives). Note, however, that other classifiers could also be used to classify stage one alerts into true positive and false positive categories.

The model 434 is used during a stage two evaluation operation 442 to classify new stage one alerts 428 and possibly generate stage two alerts 444. For example, when a new stage one alert 428 is identified because a current statistical value 440 exceeds the threshold value 426, the SVM determines whether the new alert falls into the false positive class or the true positive class. A stage two alert 444 could be generated only when a stage one alert 428 that is a true positive is active. Once the stage two alert 444 has been activated, it could remain active for the entire duration of the stage one alert.

The stage one alerts 428 and/or the stage two alerts 444 could be used in any suitable manner. For example, the alerts 428, 444 could be used to generate output data 446 that is presented for graphical display 448 (such as for presentation on the display device 224). The information that is displayed or otherwise sent to users could include any suitable data, such as the existence of a stage one alert 428 or a stage two alert 444. Additional information could also be provided, such as a possible root cause of the alert or a potential solution to the alert. The alerts could be used in any other suitable manner.

Note that the stage one training process 404 could be repeated at a regular specified interval. For example, the stage one training process 404 could be repeated every day to retrain the model(s) 424 in order to account for changing conditions and operational modes in the furnace or other equipment being monitored. The evaluation process 408 could occur continuously or at a shorter regular specified interval, such as when repeated every minute, to identify problems that develop during operation of the process equipment. The stage two training process 406 could be event-driven, such as when retraining or recalibration of the model 434 is performed after each actual flooding event in order to update the model 434.

In some embodiments, the re-training of the model(s) 424 in the stage one training process 404 follows a prescribed and parametric schema. For example, a model 424 may be generated using the seven most recent days of historical data, but the two most recent days could be ignored entirely. Of the remaining five days, the previously-mentioned operational rules 412 can be used to remove inadequate data segments from use during training. Inadequate data segments could include any time instant that violates the operational rules 412, along with data from 30 minutes leading up to such time instants and 180 minutes following such time instants. Inadequate data segments could also include any segment between two inadequate segments that is shorter than 300 minutes. Of course, other criteria for selecting data segments used to generate a model and/or for identifying inadequate data segments could be used.

Although FIG. 4 illustrates one example of a method 400 for detection of furnace flooding or other conditions, various changes may be made to FIG. 4. For example, while shown as a series of steps, various steps in FIG. 4 could overlap, occur in parallel, occur in a different order, or occur any number of times. As a particular example, the evaluation process 408 could continue executing while the stage one training process 404 is occurring.

FIG. 5 illustrates an example technique 500 for retraining a model used to detect furnace flooding or other conditions according to this disclosure. This technique 500 could, for example, be used during the stage one training process 404 to generate a model 424 in FIG. 4.

As shown in FIG. 5, the technique 500 uses data from a defined time period 502, such as data collected during the preceding week. A blackout period 504 excludes the most recent data, such as data collected during the preceding two days. The remaining period 506 includes data that could be used as training data during the model training process.

A line 508 here denotes a specific process variable signal, and limits 510 define the operational range for the process variable signal. The limits 510 could, for example, be defined using one or more of the rules 412. As specific examples, operational ranges could be placed on process variable signals identifying combustible levels, draft levels, excess oxygen ($O_2$) levels, burner pressure levels, and outlet temperature levels of a furnace.

Data segments 512 within the period 506 are identified as acceptable training data since the line 508 remains within the operational range defined by the limits 510. However, a data segment 514 is excluded from use as training data since the line 508 falls outside the operational range defined by the limits 510. Moreover, small data segments 516 that immediately lead and trail the excluded data segment 514 (such as 30 minutes leading up to the start of the excluded data segment 514 and 180 minutes following the end of the excluded data segment 514) can also be excluded from use as training data. The data within the non-excluded data segments 512 can then be processed as described above to generate one or more models 424.

Although FIG. 5 illustrates one example of a technique 500 for retraining a model used to detect furnace flooding or other conditions, various changes may be made to FIG. 5. For example, the specific time values provided above are examples only. Also, other criteria could be used to include or exclude data. In addition, FIG. 5 illustrates a specific non-limiting example of how data could be selected for use in model retraining, other data could be used in a similar manner for model retraining.

FIG. 6 illustrates an example of second stage processing used to detect furnace flooding or other conditions according to this disclosure. As noted above, the stage two evaluation operation 442 generally operates to classify stage one alerts 428 into true positives (indicative of furnace flooding or other problem) and false positives (not indicative of furnace flooding or other problem).

As shown in FIG. 6, time is initially divided into periods 602 with no stage one alerts and periods 604 with stage one alerts that are classified as false positives. For example, a support vector machine using the model(s) 434 could determine that the stage one alerts during the periods 604 are contained within the class of non-flood-leading conditions. However, during a period 606, one or more stage one alerts are now classified as true positives, which are leading indicators of an actual flooding event 608. As can be seen here, the second stage processing can eliminate a number of false positive alerts while still providing sufficient lead time for operators to respond to and possibly avoid the flooding event.

Although FIG. 6 illustrates one example of second stage processing used to detect furnace flooding or other conditions, various changes may be made to FIG. 6. For example, FIG. 6 illustrates a specific non-limiting example of how specific alerts can be handled by the second stage processing, and any other alerts could be handled by the second stage processing.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for generating timely alerts to move equipment in an industrial process to a safe operating condition comprising:
    obtaining data associated with an operation of equipment in an industrial process, wherein the data is obtained utilizing at least one sensor comprising a structure for measuring at least one characteristic in or associated with the equipment in the industrial process, the data including an operating condition of the equipment in the industrial process;
    identifying training data and evaluation data in the obtained data;
    during each of multiple training periods, identifying one or more models and one or more first statistical values using at least some of the training data and determining a threshold value using the one or more first statistical values, the one or more models representing the operation of the equipment;
    during each of multiple evaluation periods, determining one or more second statistical values using at least some of the evaluation data and the one or more models, wherein determining the one or more second statistical values for one of the evaluation periods comprises, further comprises:
        normalizing each of multiple process variable signals using signal parameters estimated during a preceding training period, the process variable signals identifying values of process variables associated with the equipment;
        generating predictions for the process variable signals based on regression coefficients estimated during the preceding training period;
        identifying errors between the predictions and the normalized process variable signals;
        scaling the errors based on standard deviations of residuals estimated during the preceding training period;
        for each of multiple time instants during the evaluation period, identifying a sum of squared scaled residuals; and
        identifying multiple second statistical values for the multiple time instants using the sum of the squared scaled residuals,
    comparing the one or more second statistical values to the threshold value determined in a preceding one of the training periods, and
    determining whether the equipment is suffering from at least one specified condition based on the comparison; and
    in response to determining that the equipment is suffering from the at least one specified condition, generating a timely alert identifying the at least one specified condition to move the equipment in an industrial process to a safe operating condition.

2. The method of claim 1, wherein determining the one or more first statistical values for one of the training periods comprises:
    estimating distribution parameters for multiple process variable signals, the process variable signals identifying values of process variables associated with the equipment;
    normalizing the process variable signals using the distribution parameters;

performing multivariate regression for the normalized process variable signals to generate regression equations;
using regression coefficients of the regression equations, identifying standard deviations of resulting residuals for the regression equations;
scaling the residuals using the standard deviations;
for each of multiple time instants during the training period, identifying the sum of squared scaled residuals; and
identifying multiple first statistical values for the multiple time instants using the sum of squared scaled residuals.

3. The method of claim 2, wherein determining the threshold value for one of the training periods comprises:
identifying distribution parameters, a mean, and a standard deviation of the multiple first statistical values generated for the training period; and
identifying the threshold value based on the distribution parameters, the mean, and the standard deviation of the multiple first statistical values.

4. The method of claim 1, wherein the at least one sensor comprises at least one of:
an oxygen sensor that measures an oxygen level located at at least one location with the equipment;
a pressure sensor that measures a pressure level at the at least one location within the equipment;
a temperature sensor that measures a temperature at the at least one location within the equipment or which measures a temperature of a process fluid being heated by the equipment;
a sensor that measures an amount of combustible material at the at least one location within the sensors; and
a sensor that measures a flow of material into the equipment.

5. The method of claim 1, wherein:
the evaluation periods occur at a first interval; and
the training periods occur at a second interval longer than the first interval and are performed to retrain the one or more models to changing conditions or operational modes of the equipment.

6. The method of claim 1, wherein identifying the training data and the evaluation data comprises:
identifying data associated with a specified length of time preceding a current time;
discarding data in a most-recent segment of the specified length of time;
in a remaining portion of the specified length of time, discarding data associated with a segment of time when a process variable signal is outside of a specified range; and
using non-discarded data in the remaining portion of the specified length of time as the training data for a current training period.

7. The method of claim 6, wherein identifying the training data and the evaluation data further comprises at least one of:
discarding a segment of the data immediately before and a segment of the data immediately after the segment of time when the process variable signal is outside of the specified range; and
discarding a segment of the data spanning less than a threshold amount of time located between two discarded segments of data.

8. The method of claim 1, wherein:
obtaining the data comprises obtaining measurements from multiple sensors including the at least one sensor, wherein at least two of the multiple sensors capture measurements at different frequencies; and
the method further comprises synchronizing the measurements from the at least two of the multiple sensors to a common time scale.

9. The method of claim 1, wherein:
the equipment in the industrial process comprises a furnace;
the obtained data comprises measurements from multiple sensors associated with the furnace; and
the at least one specified condition comprises flooding of the furnace.

10. The method of claim 9, wherein obtaining the data, identifying the training data and the evaluation data, identifying the one or more models, determining whether the equipment is suffering from the at least one specified condition, and generating the alert are repeated for each of multiple furnaces.

11. An apparatus for generating timely alerts to move equipment in an industrial process to a safe operating condition comprising:
at least one processing device configured to:
obtain data associated with operation of equipment in an industrial process, wherein the data is obtained utilizing at least one sensor comprising a structure for measuring at least one characteristic in or associated with the equipment in the industrial process, the data including an operating condition of the equipment in the industrial process;
identify training data and evaluation data in the obtained data;
during each of multiple training periods, identify one or more models and one or more first statistical values using at least some of the training data and determine a threshold value using the one or more first statistical values, the one or more models representing the operation of the equipment;
during each of multiple evaluation periods, determine one or more second statistical values using at least some of the evaluation data and the one or more models wherein determining the one or more second statistical values for one of the evaluation periods, further comprises:
normalizing each of multiple process variable signals using signal parameters estimated during a preceding training period, the process variable signals identifying values of process variables associated with the equipment;
generating predictions for the process variable signals based on regression coefficients estimated during the preceding training period;
identifying errors between the predictions and the normalized process variable signals;
scaling the errors based on standard deviations of residuals estimated during the preceding training period;
for each of multiple time instants during the evaluation period, identifying a sum of squared scaled residuals; and
identifying multiple second statistical values for the multiple time instants using the sum of the squared scaled residuals,
comparing the one or more second statistical values to the threshold value determined in a preceding one of the training periods, and determining whether the equipment is suffering from at least one specified condition based on the comparison; and in response to determining that the equipment is suffering from the at least one specified condition, generate a timely alert identifying the at least one specified condition to move the equipment in an industrial process to a safe operating condition.

12. The apparatus of claim 11, wherein, to determine the one or more first statistical values for one of the training periods, the at least one processing device is configured to:

estimate distribution parameters for multiple process variable signals, the process variable signals identifying values of process variables associated with the equipment;

normalize the process variable signals using the distribution parameters;

perform multivariate regression for the normalized process variable signals to generate regression equations;

use regression coefficients of the regression equations, identifying standard deviations of resulting residuals for the regression equations;

scale the residuals using the standard deviations;

for each of multiple time instants during the training period, identify a sum of squared scaled residuals; and identify multiple first statistical values for the multiple time instants using the sums.

13. The apparatus of claim 12, wherein, to determine the threshold value for one of the training periods, the at least one processing device is configured to:

identify distribution parameters, a mean, and a standard deviation of the multiple first statistical values generated for the training period; and identify the threshold value based on the distribution parameters, the mean, and the standard deviation of the multiple first statistical values.

14. The apparatus of claim 11, wherein the at least one sensor comprises at least one of:

an oxygen sensor that measures an oxygen level located at at least one location with the equipment;

a pressure sensor that measures a pressure level at the at least one location within the equipment;

a temperature sensor that measures a temperature at the at least one location within the equipment or which measures a temperature of a process fluid being heated by the equipment;

a sensor that measures an amount of combustible material at the at least one location within the sensors; and a sensor that measures a flow of material into the equipment.

15. The apparatus of claim 11, wherein:

the equipment in the industrial process comprises a furnace;

the obtained data comprises measurements from multiple sensors associated with the furnace including the at least one sensor among the multiple sensors; and the at least one specified condition comprises flooding of the furnace.

16. The apparatus of claim 15, wherein the measurements comprise measurements of combustible levels, draft levels, oxygen ($O_2$) levels, pressure levels, and temperature levels associated with the furnace.

17. A non-transitory computer readable medium for generating timely alerts to move equipment in an industrial process to a safe operating condition containing instructions that when executed cause at least one processing device to:

obtain data associated with operation of equipment in an industrial process, wherein the data is obtained utilizing at least one sensor comprising a structure for measuring at least one characteristic in or associated with the equipment in the industrial process, the data including an operating condition of the equipment in the industrial process;

identify training data and evaluation data in the obtained data;

during each of multiple training periods, identify one or more models and one or more first statistical values using at least some of the training data and determine a threshold value using the one or more first statistical values, the one or more models representing the operation of the equipment;

during each of multiple evaluation periods, determine one or more second statistical values using at least some of the evaluation data and the one or more models, wherein determining of the one or more second statistical values for one of the evaluation periods, further comprises:

normalizing each of multiple process variable signals using signal parameters estimated during a preceding training period, the process variable signals identifying values of process variables associated with the equipment;

generating predictions for the process variable signals based on regression coefficients estimated during the preceding training period;

identifying errors between the predictions and the normalized process variable signals;

scaling the errors based on standard deviations of residuals estimated during the preceding training period;

for each of multiple time instants during the evaluation period, identifying a sum of squared scaled residuals; and identifying multiple second statistical values for the multiple time instants using the sum of the squared scaled residuals, comparing the one or more second statistical values to the threshold value determined in a preceding one of the training periods, and determining whether the equipment is suffering from at least one specified condition based on the comparison; and in response to determining that the equipment is suffering from the at least one specified condition, generate an alert identifying the at least one specified condition.

18. The non-transitory computer readable medium of claim 17, wherein the instructions that when executed cause the at least one processing device to determine the one or more first statistical values for one of the training periods comprise instructions that when executed cause the at least one processing device to:

estimate distribution parameters for multiple process variable signals, the process variable signals identifying values of process variables associated with the equipment;

normalize the process variable signals using the distribution parameters;

perform multivariate regression for the normalized process variable signals to generate regression equations;

use regression coefficients of the regression equations, identifying standard deviations of resulting residuals for the regression equations;

scale the residuals using the standard deviations;

for each of multiple time instants during the training period, identify a sum of squared scaled residuals; and identify multiple first statistical values for the multiple time instants using the sums.

19. The non-transitory computer readable medium of claim 18, wherein the instructions that when executed cause the at least one processing device to determine the threshold value for one of the training periods comprise instructions that when executed cause the at least one processing device to:

identify distribution parameters, a mean, and a standard deviation of the multiple first statistical values generated for the training period; and identify the threshold value based on the distribution parameters, the mean, and the standard deviation of the multiple first statistical values.

20. The non-transitory computer readable medium of claim 17, wherein the at least one sensor comprises at least one of:

an oxygen sensor that measures an oxygen level located at at least one location with the equipment;

a pressure sensor that measures a pressure level at the at least one location within the equipment;

a temperature sensor that measures a temperature at the at least one location within the equipment or which measures a temperature of a process fluid being heated by the equipment;

a sensor that measures an amount of combustible material at the at least one location within the sensors; and a sensor that measures a flow of material into the equipment.

* * * * *